(12) United States Patent
Jauh et al.

(10) Patent No.: US 11,722,253 B2
(45) Date of Patent: *Aug. 8, 2023

(54) DATA PACKET TRANSMISSION METHOD AND DEVICE, STORAGE MEDIUM AND TERMINAL

(71) Applicant: SPREADTRUM COMMUNICATIONS (SHANGHAI) CO., LTD., Shanghai (CN)

(72) Inventors: Yuhren Jauh, Shanghai (CN); Yanchao Xu, Shanghai (CN); Chinghwa Yu, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/864,776

(22) Filed: Jul. 14, 2022

(65) Prior Publication Data
US 2022/0353016 A1    Nov. 3, 2022

Related U.S. Application Data

(63) Continuation of application No. 16/959,780, filed as application No. PCT/CN2020/086939 on Apr. 26, 2020, now Pat. No. 11,424,863.

(30) Foreign Application Priority Data

May 24, 2019   (CN) .......................... 201910440301.9

(51) Int. Cl.
*H04L 1/08*       (2006.01)
*H04L 5/00*       (2006.01)
(Continued)

(52) U.S. Cl.
CPC .............. *H04L 1/08* (2013.01); *H04L 5/0055* (2013.01); *H04L 47/34* (2013.01); *H04W 84/12* (2013.01)

(58) Field of Classification Search
CPC . H04L 1/04; H04L 1/08; H04L 1/1614; H04L 1/1642; H04L 1/1664;
(Continued)

(56) References Cited

U.S. PATENT DOCUMENTS 8,891,530 B2   11/2014   Sung et al.
9,420,490 B2   8/2016    Jia et al.
(Continued)

FOREIGN PATENT DOCUMENTS

CN   1774892 A      5/2006
CN   101150494 A    3/2008
(Continued)

OTHER PUBLICATIONS

CNIPA Office Action for corresponding CN Application No. 201910440301.9, dated Feb. 26, 2021.
(Continued)

*Primary Examiner* — Omer S Mian
*Assistant Examiner* — Hicham B Foud
(74) *Attorney, Agent, or Firm* — Cantor Colburn LLP

(57) ABSTRACT

A data packet transmission method and device, a storage medium and a terminal are provided. The method includes: during multi-link transmission, duplicating a first failed data packet in a transmission window to at least one other link of multiple links, wherein the multiple links include a first link on which the first failed data packet is transmitted and the at least one other link; and retransmitting the first failed data packet on the at least one other link and the first link, wherein the first failed data packet is a data packet whose transmission does not succeed and which has a smallest
(Continued)

during multi-link transmission, a first failed data packet in a transmission window is duplicated to at least one other link of multiple links, wherein the multiple links include a first link on which the first failed data packet is transmitted and the at least one other link — S301 the first failed data packet is retransmitted on the at least one other link and the first link — S302 sequence number in the transmission window. Embodiments of the present disclosure may mitigate data packet transmission blocking caused by failed data packets in a WLAN multi-link system.

18 Claims, 3 Drawing Sheets

(51) Int. Cl.
  *H04L 47/34* (2022.01)
  *H04W 84/12* (2009.01)
(58) Field of Classification Search
  CPC ....... H04L 1/1685; H04L 1/187; H04L 1/189; H04L 1/1893; H04L 1/22; H04L 47/34; H04L 5/0055; H04W 84/12
  See application file for complete search history.

(56) References Cited

U.S. PATENT DOCUMENTS

| | | | |
|---|---|---|---|
| 10,050,884 B1 | 8/2018 | Dhanabalan et al. | |
| 11,277,502 B2* | 3/2022 | Lee | H04L 1/1685 |
| 2003/0081664 A1 | 5/2003 | Lu et al. | |
| 2003/0095534 A1 | 5/2003 | Jiang | |
| 2003/0217318 A1* | 11/2003 | Choi | H04W 24/00 370/216 |
| 2006/0171353 A1 | 8/2006 | Nagata et al. | |
| 2008/0175186 A1 | 7/2008 | Liu et al. | |
| 2012/0275308 A1 | 11/2012 | Chintada et al. | |
| 2014/0254349 A1 | 9/2014 | Jia et al. | |
| 2015/0195217 A1 | 7/2015 | Ranta | |
| 2015/0365483 A1 | 12/2015 | Xiong et al. | |
| 2016/0277170 A1 | 9/2016 | Jia et al. | |
| 2017/0055176 A1 | 2/2017 | Xiao et al. | |
| 2018/0205502 A1 | 7/2018 | Merlin et al. | |
| 2018/0206174 A1 | 7/2018 | Zhou et al. | |
| 2018/0213577 A1 | 7/2018 | Burbidge et al. | |
| 2018/0367253 A1 | 12/2018 | Nammi et al. | |
| 2018/0367256 A1 | 12/2018 | Butehorn | |
| 2019/0058550 A1 | 2/2019 | Kim | |
| 2020/0107394 A1 | 4/2020 | Lee et al. | |
| 2020/0382243 A1 | 12/2020 | Li et al. | |
| 2021/0274489 A1 | 9/2021 | Fang et al. | |

FOREIGN PATENT DOCUMENTS

| | | |
|---|---|---|
| CN | 105191229 A | 12/2015 |
| CN | 106330412 A | 1/2017 |
| CN | 108512633 A | 9/2018 |
| WO | 2018128312 A1 | 7/2018 |

OTHER PUBLICATIONS

EPO Extended European Search Report for corresponding EP Application No. 20813044.3; dated Jun. 13, 2022.
International Search Report for International Application No. PCT/CN2020/086939; dated Jun. 28, 2020.
PTO Written Opinion of the International Searching Authority for International Application No. PCT/CN2020/086939; dated Jun. 28, 2020.
USPTO Non-Final Office Action for U.S. Appl. No. 16/959,780; dated Dec. 16, 2021.

* cited by examiner

DATA PACKET TRANSMISSION METHOD AND DEVICE, STORAGE MEDIUM AND TERMINAL

CROSS-REFERENCE TO RELATED APPLICATIONS

This application is a Continuation application of the U.S. patent application Ser. No. 16/959,780 filed on Jul. 2, 2020, the entire contents of which are incorporated herein by reference and priority to which is hereby claimed. Application Ser. No. 16/959,780 is the U.S. National Stage of International Application No. PCT/CN2020/086939, filed on Apr. 26, 2020. Priority under 35 U.S.C. § 119(a) and 35 U.S.C. § 365(b) is hereby claimed from Chinese Patent Application No. 201910440301.9, filed on May 24, 2019, and entitled "DATA PACKET TRANSMISSION METHOD AND DEVICE, STORAGE MEDIUM AND TERMINAL", the entire disclosure of which are both also incorporated herein by reference.

TECHNICAL FIELD

The present disclosure generally relates to communication technology field, and more particularly, to a data packet transmission method and device, a storage medium and a terminal.

BACKGROUND

At present, in a single-link system in the traditional Institute of Electrical and Electronics Engineers 802.11 (IEEE 802.11) standard (for example, the Wireless Local Area Network (WLAN) standard), in a case that data packet aggregation is allowed, when sequence numbers (SNs) of transmitted data packets reach the end of a transmission window (TX window), if transmission of a data packet with a relatively small SN does not succeed, other data packets may not be transmitted until retransmission of the data packet succeeds or the data packet is dropped.

In contrast to the traditional single-link system, in a multi-link system, data packets can be transmitted on one of a plurality of supported links. Generally, each data packet can be transmitted on any one of the links. Even in a case of non-aggregation, a concept of TX window still needs to be introduced. In a case that data packet aggregation is allowed, at a same window size, data transmission blocking more likely occurs in the multi-link system than in the single-link system.

SUMMARY

Embodiments of the present disclosure may mitigate data packet transmission blocking caused by failed data packets in a WLAN multi-link system.

In an embodiment of the present disclosure, a data packet transmission method is provided, including: during multi-link transmission, duplicating a first failed data packet in a transmission window to at least one other link of multiple links, wherein the multiple links include a first link on which the first failed data packet is transmitted and the at least one other link; and retransmitting the first failed data packet on the at least one other link and the first link, wherein the first failed data packet is a data packet whose transmission does not succeed and which has a smallest sequence number in the transmission window.

Optionally, duplicating the first failed data packet in the transmission window to the at least one other link of the multiple links includes: predicting whether the transmission window is in a data packet full condition, wherein when a difference between an end sequence number of the transmission window and a maximum sequence number of data packets in the transmission window is less than a first preset threshold, the transmission window is determined to be in the data packet full condition; and if the transmission window is in the data packet full condition, duplicating the first failed data packet in the transmission window to the at least one other link of the multiple links, wherein the first preset threshold is a positive integer.

Optionally, prior to duplicating the first failed data packet in the transmission window to the at least one other link of the multiple links, the method further includes: if a difference between the sequence number of the first failed data packet and a start sequence number of the transmission window exceeds a second preset threshold, updating the start sequence number of the transmission window, wherein the updated start sequence number of the transmission window is equal to a sum of the start sequence number of the transmission window and a third preset threshold, wherein the second preset threshold and the third preset threshold are positive integers, the third preset threshold is not less than 1 and not greater than N, and N is the difference between the sequence number of the first failed data packet and the start sequence number of the transmission window.

Optionally, prior to updating the start sequence number of the transmission window, the method further includes: transmitting a message of updating the start sequence number of the transmission window, wherein the message is carried by a block acknowledgement request frame, a predefined transmission window start sequence number update frame, a data frame with piggyback information or a control signaling frame.

Optionally, prior to predicting whether the transmission window is in a data packet full condition, the method further includes: determining whether a difference between the sequence number of the first failed data packet and a start sequence number of the transmission window is less than or equal to a fourth preset threshold, wherein if the difference is determined to be less than or equal to the fourth preset threshold, whether the transmission window is in a data packet full condition is determined.

Optionally, the method further includes: if retransmission of the first failed data packet succeeds, and transmission of at least one other data packet in the transmission window does not succeed, updating a start sequence number of the transmission window, wherein the updated start sequence number of the transmission window is a smallest sequence number of the at least one data packet.

Optionally, the method further includes: if retransmission of the first failed data packet succeeds, and transmission of all other data packets in the transmission window succeeds, updating a start sequence number of the transmission window, wherein the updated start sequence number of the transmission window is an end sequence number of the transmission window plus one.

Optionally, the method further includes: if retransmission of the first failed data packet succeeds, stopping retransmitting the first failed data packet.

In an embodiment of the present disclosure, a data packet transmission device is provided, including: a duplication circuitry configured to: during multi-link transmission, duplicate a first failed data packet in a transmission window to at least one other link of multiple links, wherein the multiple links include a first link on which the first failed data packet is transmitted and the at least one other link; and a retransmission circuitry configured to retransmit the first failed data packet on the at least one other link and the first link, wherein the first failed data packet is a data packet whose transmission does not succeed and which has a smallest sequence number in the transmission window.

In an embodiment of the present disclosure, a storage medium having computer instructions stored therein is provided, wherein when the computer instructions are executed, the above method is performed.

In an embodiment of the present disclosure, a terminal including a memory and a processor is provided, wherein the memory has computer instructions stored therein, and when the processor executes the computer instructions, the above method is performed.

Embodiments of the present disclosure may provide following advantages.

Embodiments of the present disclosure provide a data packet transmission method, including: during multi-link transmission, duplicating a first failed data packet in a transmission window to at least one other link of multiple links, wherein the multiple links include a first link on which the first failed data packet is transmitted and the at least one other link; and retransmitting the first failed data packet on the at least one other link and the first link, wherein the first failed data packet is a data packet whose transmission does not succeed and which has a smallest sequence number in the transmission window. In the embodiments, by duplicating the first failed data packet to the at least one other link, the first failed data packet can be retransmitted on multiple links, thereby improving probability of successful retransmission. Further, compared with data retransmission on a single link, the retransmission in the embodiments of the present disclosure can be performed on multiple links, which may greatly lower latency of retransmission.

Further, duplicating the first failed data packet in the transmission window to the at least one other link of the multiple links includes: predicting whether the transmission window is in a data packet full condition, wherein when a difference between an end sequence number of the transmission window and a maximum sequence number of data packets in the transmission window is less than a first preset threshold, the transmission window is determined to be in the data packet full condition; and if the transmission window is in the data packet full condition, duplicating the first failed data packet in the transmission window to the at least one other link of the multiple links, wherein the first preset threshold is a positive integer. In the embodiments, whether the transmission window is in a data packet full condition is early predicted, and if the transmission window is in the data packet full condition, the first failed data packet in the transmission window is duplicated to the at least one other link, which may solve transmission window blocking.

DETAILED DESCRIPTION

As described in the background, data transmission blocking more likely occurs in a multi-link system, and no solution is available at present.

Those skilled in the art can understand that, in existing techniques, when sequence numbers of transmitted data packets reach the end of a TX window, there may be a first data packet with a relatively small sequence number in the TX window whose transmission does not succeed. In this case, a new data packet cannot be transmitted until retransmission of the first data packet succeeds or the first data packet is dropped. At a same TX window size, data transmission blocking more likely occurs in the multi-link system than in a single-link system.

Figure 1:
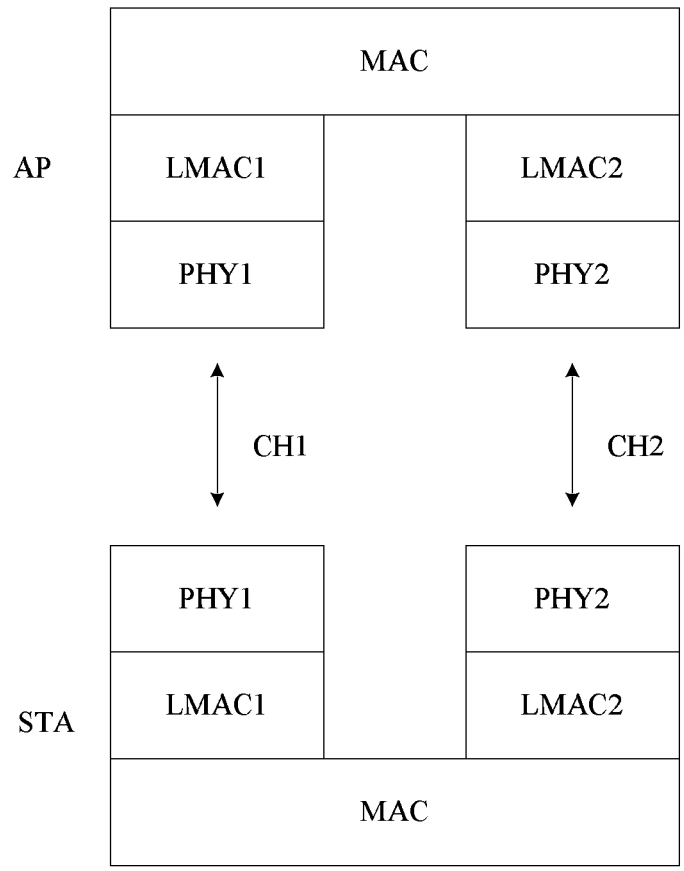
FIG. 1 is a diagram of data transmission in a multi-link system in existing techniques.

FIG. 1 is a diagram of data transmission in a multi-link system in existing techniques. As shown in FIG. 1, there are two links, including a link CH1 and a link CH2. When a WLAN access point (AP) interacts with a station (STA), data flows into a LMAC (Lower MAC) layer (shown as LMAC1 and LMAC2) and a physical layer (shown as PHY1 and PHY2) via a Medium Access Control (MAC) layer of a transmitter, then is transmitted to a physical layer (shown as PHY1 and PHY2) and a LMAC layer (shown as LMAC1 and LMAC2) of a receiver via the links CH1 and CH2, and then is uploaded to a MAC layer.

The links CH1 and CH2 are two different links, which may be in a same frequency band or different frequency bands. For example, the links CH1 and CH2 are in a frequency band of 2 GHz and a frequency band of 5 GHz, respectively. In some embodiments, data to be transmitted is stored in a queuing list of a link and transmitted after the link is accessed.

Figure 2:
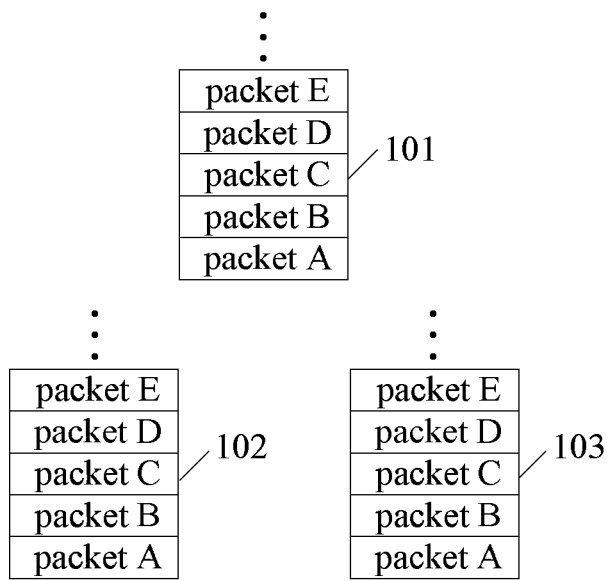
FIG. 2 is a diagram illustrating data flowing into two links in existing techniques.

Referring to FIG. 2, FIG. 2 is a diagram illustrating data flowing into two links in existing techniques. In FIG. 2, data packets 101 to be transmitted include a data packet A, a data packet B, a data packet C, a data packet D, a data packet E and etc. In some embodiments, available links for each data packet to be transmitted are specified. In some embodiments, two links may be assigned for each data packet to be transmitted. Referring to FIG. 1, in a transmission of non-aggregation and non-QoS, a terminal includes two physical layers, and links CH1 and CH2. A queuing list 102 of the link CH1 includes the data packets A, B, C, D, E and etc., and a queuing list 103 of the link CH2 includes the data packets A, B, C, D, E and etc. All the data packets to be transmitted can be transmitted via any physical layer. The data packets to be transmitted are stored in corresponding queuing lists (the queuing list 102 and the queuing list 103). When the link CH1 obtains a transmission opportunity, the data packet A is transmitted via the link CH1 and is removed from the queuing list 103. Afterward, when the link CH2 obtains a transmission opportunity, the data packet B is transmitted via the link CH2, and is removed from the queuing list 102.

In the multi-link system, when a solution similar to that shown in FIG. 2 is adopted, the number of available links increases. In this case, if quality of the links is high, transmission of the data packets is sped up. However, if quality of one link is low and transmission of a data packet on that link fails, while the data packet has been removed from other links and remaining data packets can be transmitted via the other links, it is likely that a TX window is in a data packet full condition, which may cause data transmission blocking.

Embodiments of the present disclosure provide a data packet transmission method includes: during multi-link transmission, duplicating a first failed data packet in a transmission window to at least one other link of multiple links, wherein the multiple links include a first link on which the first failed data packet is transmitted and the at least one other link; and retransmitting the first failed data packet on the at least one other link and the first link, wherein the first failed data packet is a data packet whose transmission does not succeed and which has a smallest sequence number in the transmission window.

In the embodiments, by duplicating the first failed data packet to the at least one other link, the first failed data packet can be retransmitted on multiple links, thereby improving probability of successful retransmission. Further, compared with data retransmission on a single link, the retransmission in the embodiments of the present disclosure can be performed on multiple links, which may greatly lower latency of retransmission.

In order to clarify the objects, characteristics and advantages of the disclosure, embodiments of present disclosure will be described in detail in conjunction with accompanying drawings.

Figure 3:
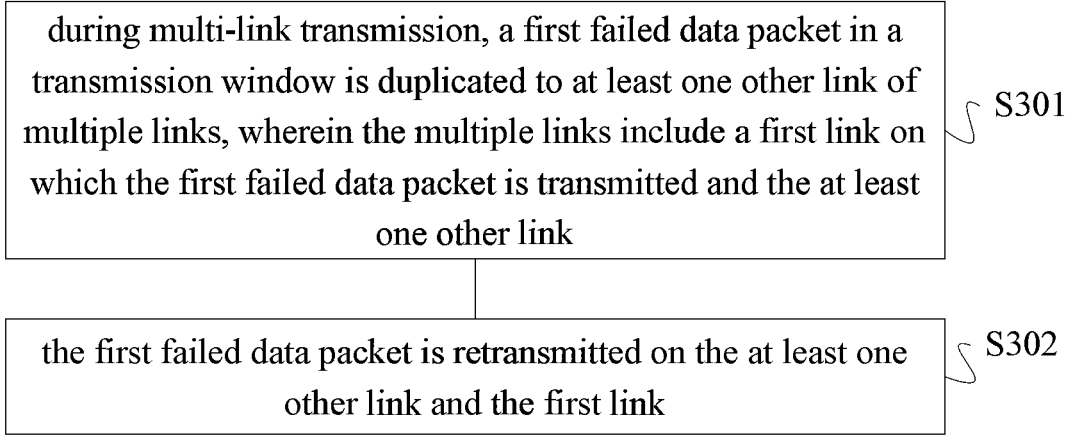
FIG. 3 is a flow chart of a data packet transmission method according to an embodiment.

FIG. 3 is a flow chart of a data packet transmission method according to an embodiment. The method may be performed by a terminal, such as a WLAN AP or a WLAN STA. In some embodiments, the method may include S301 and S302.

In S301, during multi-link transmission, a first failed data packet in a transmission window is duplicated to at least one other link of multiple links, wherein the multiple links include a first link on which the first failed data packet is transmitted and the at least one other link.

In S302, the first failed data packet is retransmitted on the at least one other link and the first link.

The first failed data packet is a data packet whose transmission does not succeed and which has a smallest sequence number in the transmission window.

In some embodiments, if a WLAN system is a multi-link system, WLAN data transmission may be performed on the multiple links.

In S301, when there are multiple links, for a data packet on a particular link, if transmission of the data packet fails and the data packet has a smallest sequence number in the transmission window, the data packet may be considered as the first failed data packet. In this case, if the terminal has at least one other available link other than the first link, the terminal may duplicate the first failed data packet in the transmission window to the at least one other link, where the multiple links include the first link on which the first failed data packet is transmitted and the at least one other link.

In some embodiments, when a difference between an end sequence number of the transmission window and a maximum sequence number of data packets in the transmission window is less than a first preset threshold, the transmission window is determined to be in a data packet full condition, wherein the first preset threshold is a positive integer. The transmission window being in the data packet full condition indicates that the transmission window is filled with data packets or will soon be filled with data packets.

In some embodiments, if a difference between the sequence number of the first failed data packet and a start sequence number of the transmission window exceeds a second preset threshold, a message of updating the start sequence number of the transmission window may be transmitted by the terminal, wherein the message is carried by a Block Acknowledgement Request (BAR) frame, a predefined transmission window start sequence number update frame (for example, a newly defined signaling frame), a data frame with piggyback information or a control signaling frame.

Afterward, if receiving an acknowledgement message from a receiver of the data packets, the terminal may update the start sequence number of the transmission window, wherein the updated start sequence number of the transmission window is equal to a sum of the start sequence number of the transmission window and a third preset threshold, wherein the second preset threshold and the third preset threshold are positive integers, the third preset threshold is not less than 1 and not greater than N, and N is the difference between the sequence number of the first failed data packet and the start sequence number of the transmission window.

In some embodiments, the terminal may duplicate the first failed data packet in the transmission window to the at least one other link of the multiple links, so as to transmit the first failed data packet on multiple links.

In S302, the terminal may retransmit the first failed data packet on the at least one other link and the first link.

In some embodiments, if there are more than one available links, the terminal may retransmit the first failed data packet in parallel on the more than one available links.

In some embodiments, if there is merely one available link currently, the terminal may transmit the first failed data packet on the available link. If the terminal obtains one or more other available links during the transmission of the first failed data packet and when a feedback message of successful transmission has not been received, the terminal may redundantly retransmit the first failed data packet on the one or more other available links, so that the receiver can successfully receive the first failed data packet as soon as possible.

In some embodiments, for the links on which the first failed data packet is transmitted, no matter on which link the retransmission of the first failed data packet succeeds, the transmission of the first failed data packet on other links may stop, and the first failed data packet may be removed from the links. If retransmission of the first failed data packet does not succeed, the first failed data packet may continue to be retransmitted on the multiple links until retransmission on one of the links succeeds or a maximum number of data packet retransmissions is reached.

It should be noted that the maximum number of data packet retransmissions may be a total number of transmissions on all the multiple links, or may be a maximum number of retransmissions independently counted by each link. In this case, the total number of transmissions of the first failed data packet is greater than a maximum number of data packet retransmissions in the existing techniques.

In some embodiments, if retransmission of the first failed data packet succeeds, and transmission of all other data packets in the transmission window succeeds, the terminal may update a start sequence number of the transmission window, wherein the updated start sequence number of the transmission window is an end sequence number of the transmission window plus one.

In some embodiments, if retransmission of the first failed data packet succeeds, and transmission of at least one other data packet (its sequence number is greater than that of the first failed data packet) in the transmission window does not succeed, the terminal may update the start sequence number of the transmission window, wherein the updated start sequence number of the transmission window is equal to the sequence number of the at least one other failed data packet.

In some embodiments, if the difference between the sequence number of the at least one other failed data packet and the sequence number of the first failed data packet is small, to avoid frequent update of the start sequence number of the transmission window, the start sequence number of the transmission window may be updated after the retransmission of the at least one other failed data packet succeeds.

An example is described in detail below.

Assume that the start sequence number of the TX window is WinStart, the end sequence number of the TX window is WinEnd, length of the TX window is WinSize=WinEnd-WinStart+1, and SN represents a sequence number of a data packet and is a non-negative integer. In the example, a data packet with a sequence number SN_f is a data packet whose transmission does not succeed, and which has a smallest sequence number in the TX window, and SN_e is a maximum sequence number of the data packets in the TX window. When SN_e=WinEnd, it indicates that the TX window is in a data packet full condition.

In the multi-link system, to effectively avoid TX window blocking caused by failure of transmission of the data packet with a relatively small sequence number, an early prediction mechanism is introduced in the embodiments of the present disclosure.

In some embodiments, TX_window_full_alarm represents a prediction result, where TX_window_full_alarm of 1 indicates that the TX window is in a data packet full condition, TX_window_full_alarm of 0 indicates that the TX window is not in a data packet full condition. In some embodiments, when WinEnd-SN_e<=TH1, TX_window_full_alarm=1; otherwise, TX_window_full_alarm=0.

In some embodiments, if TX_window_full_alarm=1 and SN_f>WinStart, WinStart may be updated to avoid a data packet full condition of the TX window. In some embodiments, to avoid too frequent update of WinStart, the following method may be used. If SN_f-WinStart>=TH2, the original WinStart may be replaced with (WinStart+Delta), where 1<=Delta<=(SN_f-WinStart).

Those skilled in the art cam understand that before updating WinStart, the terminal may transmit a BAR frame carrying a message of updating the start sequence number of the transmission window, so as to notify the receiver to update the start sequence number of the transmission window. The update transmission window start sequence number message may be carried by a BAR frame, a predefined transmission window start sequence number update frame, a data frame with piggyback information or a control signaling frame. After receiving an acknowledgement from the receiver, the terminal and the receiver may update WinStart, and accordingly, WinEnd is updated with the update of WinStart.

In some embodiments, if TX_window_full_alarm=1, the first failed data packet with sequence number SN_f may be duplicated to other channels for transmission, and the duplicated data packet has a higher priority.

In some embodiments, after retransmission of the first failed data packet with the sequence number SN_f on any link succeeds, there may still be other data packets whose transmission does not succeed in the TX window. Assuming that among the other data packets whose transmission does not succeed, a smallest sequence number is new_SN_f, and thus the data packet with the sequence number new_SN_f becomes a new first failed data packet in the current TX window. In this case, if the start sequence number of the TX window is updated, the updated start sequence number is new_SN_f.

In some embodiments, if retransmission of the data packet with the sequence number SN_f succeeds, but new_SN_f-SN_f is too small, the start sequence number may be updated only once to the latest new_SN_f after multiple data packet retransmissions succeed.

In some embodiments, after retransmission of the first failed data packet with the sequence number SN_f succeeds and transmission of all other data packets in the TX window succeeds, the updated start sequence number of the TX window may be SN_e+1, where SN_e is a maximum sequence number of the data packets in the TX window.

Those skilled in the art can understand that if retransmission of the first failed data packet with the sequence number SN_f succeeds on any link, the retransmission of the first failed data packet with the sequence number SN_f on other links may stop and be deleted. Once retransmission of the data packet with the sequence number SN_f succeeds, the retransmission is terminated, and the data packet with the sequence number SN_f is removed.

From above, in the embodiments of the present disclosure, in a WLAN multi-link system, data packet transmission blocking caused by failed data packets may be mitigated in a WLAN multi-link system. Further, the retransmission can be performed on multiple links, which may increase probability of successful retransmission and lower latency of retransmission.

Figure 4:
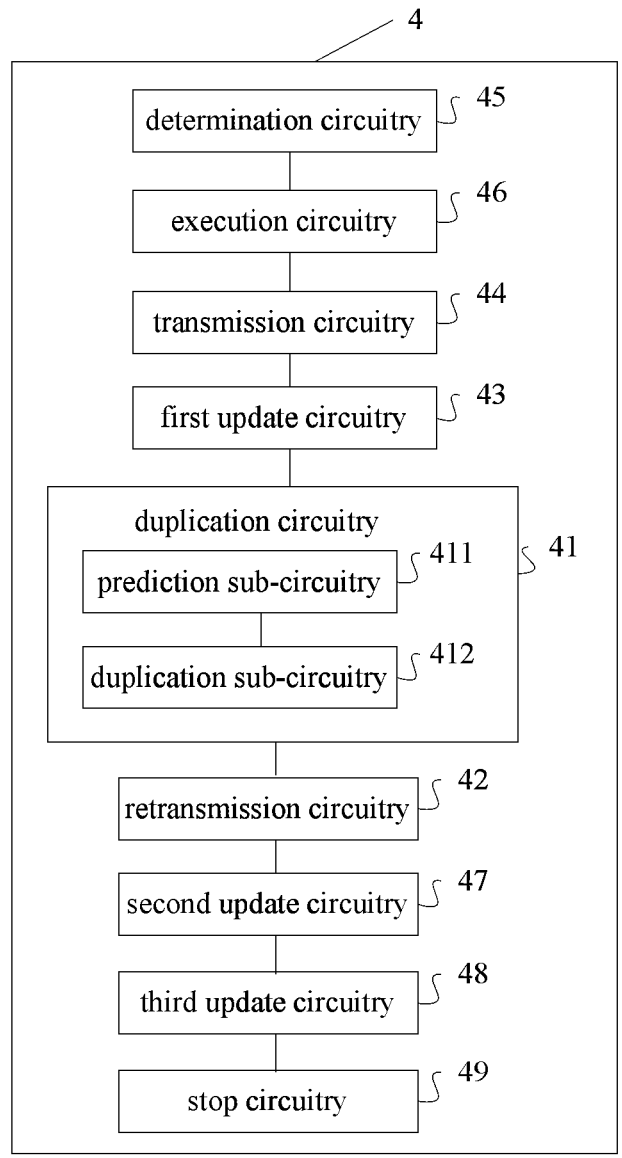
FIG. 4 is a structural diagram of a data packet transmission device according to an embodiment.

FIG. 4 is a structural diagram of a data packet transmission device according to an embodiment. The device 4 can execute the method as shown in FIG. 3, and may be applied in a terminal, such as a WLAN AP or a WLAN STA.

In some embodiments, the device 4 may include: a duplication circuitry 41 configured to: during multi-link transmission, duplicate a first failed data packet in a transmission window to at least one other link of multiple links, wherein the multiple links include a first link on which the first failed data packet is transmitted and the at least one other link; and a retransmission circuitry 42 configured to retransmit the first failed data packet on the at least one other link and the first link, wherein the first failed data packet is a data packet whose transmission does not succeed and which has a smallest sequence number in the transmission window.

In some embodiments, the duplication circuitry 41 may include: a prediction sub-circuitry 411 configured to predict whether the transmission window is in a data packet full condition, wherein when a difference between an end sequence number of the transmission window and a maximum sequence number of data packets in the transmission window is less than a first preset threshold, the transmission window is determined to be in the data packet full condition; and a duplication sub-circuitry 412 configured to: if the transmission window is in the data packet full condition, duplicate the first failed data packet in the transmission window to the at least one other link of the multiple links, wherein the first preset threshold is a positive integer.

In some embodiments, the device 4 may further include a first update circuitry 43 configured to: if a difference between the sequence number of the first failed data packet and a start sequence number of the transmission window exceeds a second preset threshold, update the start sequence number of the transmission window, wherein the updated start sequence number of the transmission window is equal to a sum of the start sequence number of the transmission window and a third preset threshold, wherein the second preset threshold and the third preset threshold are positive integers, the third preset threshold is not less than 1 and not greater than N, and N is the difference between the sequence number of the first failed data packet and the start sequence number of the transmission window.

In some embodiments, the device 4 may further include a transmission circuitry 44 configured to transmit a message of updating the start sequence number of the transmission window before the start sequence number of the transmission window is updated, wherein the message is carried by a block acknowledgement request frame, a predefined transmission window start sequence number update frame, a data frame with piggyback information or a control signaling frame.

In some embodiments, the device 4 may further include: a determination circuitry 45 configured to: before whether the transmission window is in a data packet full condition is predicted, determine whether a difference between the sequence number of the first failed data packet and a start sequence number of the transmission window is less than or equal to a fourth preset threshold; and an execution circuitry 46 configured to: if the difference is determined to be less than or equal to the fourth preset threshold, predict whether the transmission window is in a data packet full condition.

In some embodiments, the device 4 may further include a second update circuitry 47 configured to: if retransmission of the first failed data packet succeeds, and transmission of at least one other data packet in the transmission window does not succeed, update a start sequence number of the transmission window, wherein the updated start sequence number of the transmission window is a smallest sequence number of the at least one data packet.

In some embodiments, the device 4 may further include a third update circuitry 48 configured to: if retransmission of the first failed data packet succeeds, and transmission of all other data packets in the transmission window succeeds, update a start sequence number of the transmission window, wherein the updated start sequence number of the transmission window is an end sequence number of the transmission window plus one.

In some embodiments, the device 4 may further include a stop circuitry 49 configured to: if retransmission of the first failed data packet succeeds, stop retransmitting the first failed data packet.

More details of working principles and working modes of the device 4 can be found in the above descriptions of FIG. 3 and are not described here.

In an embodiment of the present disclosure, a storage medium having computer instructions stored therein is provided, wherein when the computer instructions are executed, the above method as shown in FIG. 3 is performed. The storage medium may include a non-volatile or non-transitory memory. The storage medium may include a Read Only Memory (ROM), a Random Access Memory (RAM), a magnetic disk or an optical disk.

In an embodiment of the present disclosure, a terminal including a memory and a processor is provided, wherein the memory has computer instructions stored therein, and when the processor executes the computer instructions, the above method as shown in FIG. 3 is performed. In some embodiments, the terminal may be a WLAN AP or a WLAN STA.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A method for transmitting data packets in multiple links, comprising:
   determining a first failed data packet in a transmission window, wherein the first failed data packet is a data packet whose transmission does not succeed and which has a smallest sequence number in the transmission window;
   determining whether a difference between the sequence number of the first failed data packet and a start sequence number of the transmission window is less than or equal to a first preset threshold;
   determining whether the transmission window is in a data packet full condition based on the difference being less than or equal to the first preset threshold;
   duplicating the first failed data packet in the transmission window to at least one other link of the multiple links based on the transmission window being in the data packet full condition, wherein the multiple links comprise a first link on which the first failed data packet is transmitted and the at least one other link; and
   retransmitting the first failed data packet on the at least one other link and the first link.

2. The method according to claim 1, wherein said determining whether the transmission window is in a data packet full condition comprises:
   determining that the transmission window is in the data packet full condition based on a difference between an end sequence number of the transmission window and a maximum sequence number of data packets in the transmission window being less than a second preset threshold, wherein the second preset threshold is a positive integer.

3. The method according to claim 1, wherein the transmission window being in the data packet full condition comprises the transmission window being filled with data packets or being to be filled with data packets soon.

4. The method according to claim 1, further comprising:
   determining a difference between the sequence number of the first failed data packet and the start sequence number of the transmission window; and
   transmitting a message of updating the start sequence number of the transmission window based on the difference between the sequence number of the first failed data packet and the start sequence number of the transmission window exceeding a third preset threshold.

5. The method according to claim 4, further comprising:
   updating the start sequence number of the transmission window based on an acknowledgement message, wherein the acknowledgement message is in response to the message of updating the start sequence number of the transmission window, the updated start sequence number of the transmission window is equal to a sum of the start sequence number of the transmission window and a fourth preset threshold, the third preset threshold and the fourth preset threshold are positive integers, the fourth preset threshold is not less than 1 and not greater than N, and N is the difference between the sequence number of the first failed data packet and the start sequence number of the transmission window.

6. The method according to claim 1, further comprising:
   updating a start sequence number of the transmission window in response to success of retransmission of the first failed data packet.

7. The method according to claim 6, wherein based on transmission of at least one other data packet in the transmission window not succeeding, said updating a start sequence number of the transmission window comprises:
   updating the start sequence number of the transmission window to be a smallest sequence number of the at least one data packet.

8. The method according to claim 6, wherein based on transmission of all other data packets in the transmission window succeeding, said updating a start sequence number of the transmission window comprises:
- updating the start sequence number of the transmission window to be an end sequence number of the transmission window plus one.

9. The method according to claim 1, further comprising:
- stopping retransmitting the first failed data packet in response to success of retransmission of the first failed data packet.

10. A non-transitory storage medium storing one or more programs, the one or more programs comprising computer instructions, which, when executed by a processor, cause the processor to:
- determine a first failed data packet in a transmission window, wherein the first failed data packet is a data packet whose transmission does not succeed and which has a smallest sequence number in the transmission window;
- determine whether a difference between the sequence number of the first failed data packet and a start sequence number of the transmission window is less than or equal to a first preset threshold;
- determine whether the transmission window is in a data packet full condition based on the difference being less than or equal to the first preset threshold;
- duplicate the first failed data packet in the transmission window to at least one other link of multiple links based on the transmission window being in the data packet full condition, wherein the multiple links comprise a first link on which the first failed data packet is transmitted and the at least one other link; and
- retransmit the first failed data packet on the at least one other link and the first link.

11. The non-transitory storage medium according to claim 10, wherein said determining whether the transmission window is in a data packet full condition comprises:
- determining that the transmission window is in the data packet full condition based on a difference between an end sequence number of the transmission window and a maximum sequence number of data packets in the transmission window being less than a second preset threshold, wherein the second preset threshold is a positive integer.

12. A terminal comprising a memory and a processor, wherein the memory stores one or more programs, the one or more programs comprising computer instructions, which, when executed by the processor, cause the processor to:
- determine a first failed data packet in a transmission window, wherein the first failed data packet is a data packet whose transmission does not succeed and which has a smallest sequence number in the transmission window;
- determine whether a difference between the sequence number of the first failed data packet and a start sequence number of the transmission window is less than or equal to a first preset threshold;
- determine whether the transmission window is in a data packet full condition based on the difference being less than or equal to the first preset threshold;
- duplicate the first failed data packet in the transmission window to at least one other link of multiple links based on the transmission window being in the data packet full condition, wherein the multiple links comprise a first link on which the first failed data packet is transmitted and the at least one other link; and
- retransmit the first failed data packet on the at least one other link and the first link.

13. The terminal according to claim 12, wherein said determining whether the transmission window is in a data packet full condition comprises:
- determining that the transmission window is in the data packet full condition based on a difference between an end sequence number of the transmission window and a maximum sequence number of data packets in the transmission window being less than a second preset threshold,
- wherein the second preset threshold is a positive integer, and the transmission window being in the data packet full condition comprises the transmission window being filled with data packets or being to be filled with data packets soon.

14. The terminal according to claim 12, wherein the processor is further caused to:
- determine a difference between the sequence number of the first failed data packet and the start sequence number of the transmission window; and
- transmit a message of updating the start sequence number of the transmission window based on the difference between the sequence number of the first failed data packet and the start sequence number of the transmission window exceeding a third preset threshold.

15. The terminal according to claim 14, wherein the processor is further caused to:
- update the start sequence number of the transmission window based on an acknowledgement message,
- wherein the acknowledgement message is in response to the message of updating the start sequence number of the transmission window, the updated start sequence number of the transmission window is equal to a sum of the start sequence number of the transmission window and a fourth preset threshold, the third preset threshold and the fourth preset threshold are positive integers, the fourth preset threshold is not less than 1 and not greater than N, and N is the difference between the sequence number of the first failed data packet and the start sequence number of the transmission window.

16. The terminal according to claim 12, wherein the processor is further caused to:
- update a start sequence number of the transmission window or stop retransmitting the first failed data packet in response to success of retransmission of the first failed data packet.

17. The terminal according to claim 16, wherein based on transmission of at least one other data packet in the transmission window not succeeding, said updating a start sequence number of the transmission window comprises:
- updating the start sequence number of the transmission window to be a smallest sequence number of the at least one data packet.

18. The terminal according to claim 16, wherein based on transmission of all other data packets in the transmission window succeeding, said updating a start sequence number of the transmission window comprises:
- updating the start sequence number of the transmission window to be an end sequence number of the transmission window plus one.

* * * * *